N. L. JANNEY.
Butter Mold.
No. 70,095.     Patented Oct. 22, 1867.
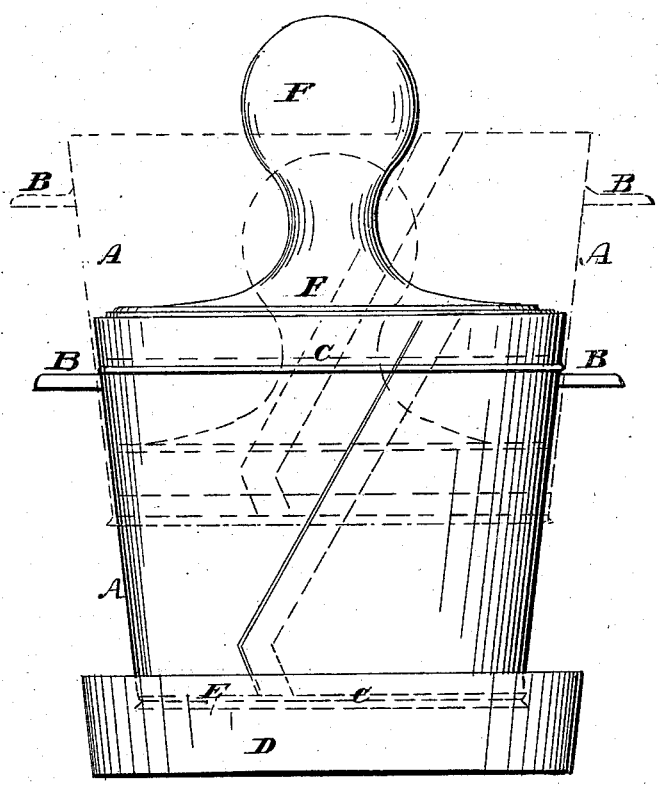
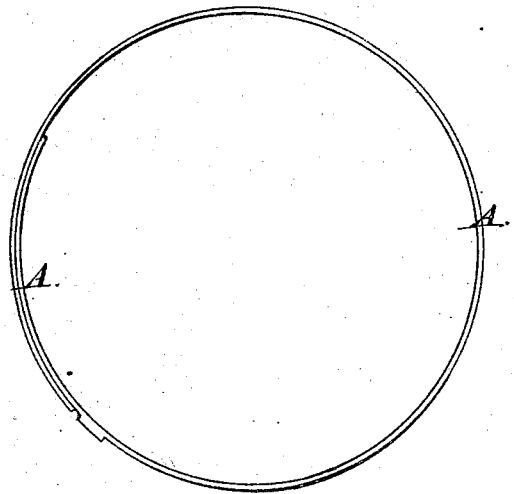

United States Patent Office.

NATHAN L. JANNEY, OF PHILADELPHIA, PENNSYLVANIA, ASSIGNOR TO HIMSELF AND HORATIO I. KURTZ, OF SAME PLACE.

Letters Patent No. 70,095, dated October 22, 1867.

IMPROVEMENT IN BUTTER-STAMP.

*The Schedule referred to in these Letters Patent and making part of the same.*

TO ALL WHOM IT MAY CONCERN:

Be it known that I, NATHAN L. JANNEY, of Philadelphia, in the county of Philadelphia, and State of Pennsylvania, have invented certain new and useful Improvements in Expanding and Contracting Bowls or Butter-Stamps; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to butter-moulds, and consists in constructing a mould for easily and conveniently moulding and stamping butter in small parcels. In the drawings—

Figure 1 is a side elevation, showing the position of the mould at different stages of the process.

Figure 2 is a horizontal cross-section on the line $x\ x$ of fig. 1.

I construct my mould A of tin or other suitable metal, and of any size desired. I make it circular on the inside, and tapering from top to bottom, as shown in fig. 1, and also allow the ends of the metal out of which the body is formed to lap over each other, as shown in fig. 2. On opposite sides of the mould A, and near its upper side, I fasten ears or handles B B, and around either end of the mould I place elastic straps or bands C. The lower end of the mould I set into a board, D, provided with a recess, E, of the proper size and shape to receive it. Into the upper end of the mould I place a stamp, F, having any desired device on its lower side.

In operating my butter-mould, I place it with its lower end in the recess E, then put in it the desired quantity of butter. This done, I press the stamp F down against the butter, as shown by the red lines in fig. 1, hold it there firmly, and at the same time take hold of the ears or handles B B and draw the mould A up over the stamp F. As the stamp F fits closely within the mould A, the sides of which lap and are held together by elastic bands C only, it will be noticed that the mould A will spread and detach itself from the butter, as shown by the blue lines of fig. 1. When the mould is drawn up sufficiently far, the moulded butter can be taken off and the process repeated by simply removing or taking out the stamp and placing the mould back into the recess.

Having thus described my invention, what I claim, is—

The expansive mould A, when constructed and arranged as described and for the purpose set forth.

NATHAN L. JANNEY.

Witnesses:
W. H. REASE,
H. I. KURTZ.